United States Patent
Ohta et al.

(10) Patent No.: US 6,647,786 B2
(45) Date of Patent: Nov. 18, 2003

(54) TUNING-FORK TYPE VIBRATION GYRO AND ELECTRODE TRIMMING METHOD THEREFOR

(75) Inventors: Kazuhiro Ohta, Nagano (JP); Masanori Yachi, Nagano (JP); Yoshitaka Takahashi, Nagano (JP); Kazutsugu Kikuchi, Nagano (JP); Keiji Saito, Nagano (JP)

(73) Assignee: Fujitsu Media Devices Limited, Nagano (JP)

( * ) Notice: Subject to any disclaimer, the term of this patent is extended or adjusted under 35 U.S.C. 154(b) by 114 days.

(21) Appl. No.: 09/930,147

(22) Filed: Aug. 16, 2001

(65) Prior Publication Data

US 2002/0148290 A1 Oct. 17, 2002

(30) Foreign Application Priority Data

Apr. 13, 2001 (JP) .......................... 2001-116056

(51) Int. Cl.[7] .............................. G01C 19/00; G01P 3/00
(52) U.S. Cl. ....................... 73/504.16; 73/497
(58) Field of Search ............................ 73/504.16, 497, 73/509; 310/315

(56) References Cited

FOREIGN PATENT DOCUMENTS

JP         2000-9476        1/2000

*Primary Examiner*—Richard A. Moller
(74) *Attorney, Agent, or Firm*—Arent Fox Kintner Plotkin & Kahn, PLLC

(57) ABSTRACT

A tuning-fork type vibration gyro enables to suppress pyro-electric noise caused by temperature change and to obtain sensor output having high signal-to-noise ratio. The tuning-fork type vibration gyro includes a tuning-fork type vibration body having two arms mutually disposed in parallel and a base for commonly supporting one end of the each arm, wherein a longitudinal direction of the two arms is defined as a z-axis and a perpendicular direction thereto is defined as an x-axis; driving electrodes respectively formed on the two arms for generating vibration of the two arms in a direction parallel to the x-axis; detecting electrodes respectively formed on the two arms for detecting electromotive force generated when the tuning-fork type vibration body is rotated around the z-axis; and dummy electrodes formed on the two arms in respective areas different from the driving electrodes and the detecting electrodes.

9 Claims, 20 Drawing Sheets fx mode vibrationfy mode vibration fx mode vibration      fy mode vibration

TUNING-FORK TYPE VIBRATION GYRO AND ELECTRODE TRIMMING METHOD THEREFOR

FIELD OF THE INVENTION

The present invention relates to a tuning-fork type vibration gyro and an electrode trimming method therefor and more particularly a tuning-fork type vibration gyro and an electrode trimming method therefor which enable to reduce pyroelectric noise produced by temperature change and to obtain sensor output having high signal-to-noise ratio.

BACKGROUND OF THE INVENTION

In recent years, a tuning-fork type vibration gyro has been developed aiming to provide a miniaturized gyroscope. The gyro of this type typically includes two arms and a base to support the arms integrally formed of ferroelectric material. The gyro is used for detecting angular rate in a car navigation system, unintentional hand movement in a video camera, and so forth.

In FIG. 15, there is shown a schematic configuration diagram of an example of the tuning-fork type vibration gyro disclosed in the official gazette of Japanese Unexamined Patent Publication No. 2000-9476 by the present applicants. The tuning-fork type vibration gyro includes a tuning-fork type vibration body 51 constituted by two arms 52, 53, and a base 54 for supporting the arms. This tuning-fork type vibration body 51 is formed integrally with ferroelectric material of lithium tantalate ($LiTaO_3$), lithium niobate ($LiNbO_3$) or the like.

The bottom plane of base 54 of tuning-fork type vibration body 51 is fixed to a support substrate 56 having a slit in the center portion thereof. At this slit, support substrate 56 is connected to a support arm 57 through a bonding layer 58 formed of rubbery elastic body. Both ends of support arm 57 are bent perpendicularly to secure to a stem 55.

Stem 55 secures a circuit board 60 on which a driving circuit for vibrating arms 52, 53, a sensor circuit for detecting a signal output from tuning-fork-type vibration body 51, etc. is mounted. These members are covered with a cap 59 to protect against externally applied impulse. Using such tuning-fork type vibration gyro, angular rate of rotation around z-axis, which is parallel with arms 52, 53 can be detected.

Two arms 52, 53 of tuning-fork type vibration body 51 are driven by a non-illustrated driving circuit so that each end of two arms 52, 53 vibrates in the x-axis direction. This vibration is referred to as fx mode vibration, or in-plane vibration. During this state, when tuning-fork type vibration gyro rotates around z-axis, Coriolis force is generated to two arms 52, 53 in the y-axis direction, perpendicular to x-axis, in proportion to the angular rate of rotation.

For this reason, each end of two arms 52, 53 starts fy mode vibration in the y-axis direction having magnitude proportional to the Coriolis force. The fy mode vibration is referred to as plane-vertical vibration. Coriolis force is proportional to angular rate of rotation. Therefore the angular rate of rotation can be detected by detecting the magnitude of fy mode vibration.

Next, an electrode configuration of the tuning-fork type vibration gyro is illustrated hereafter. FIG. 16A shows a perspective view of tuning-fork type vibration body 51, while FIG. 16B shows a plan view of tuning-fork type vibration body 51 viewed from the upper side.

As shown in FIG. 16B, driving electrodes 61, 62 are provided on arm 52, and driving electrodes 63, 64 are provided on arm 53. These driving electrodes are aimed to produce fx mode vibration. Also, as electrodes for detecting fy mode vibration, detecting electrodes 71, 72 and 73 are provided on arm 52, and also detecting electrodes 74, 75 and 76 are provided on arm 53.

In FIGS. 17A and 17B, a chart is shown for illustrating fx mode vibration. As shown in FIG. 17A, when driving voltage generated by an oscillator 81 is applied between driving electrodes 61 and 62, and also between electrodes 63 and 64, an electric field E is produced in arms 52, 53 to expand and contract the side faces of arms 52, 53 as a consequence of piezoelectric effect. This expansion and contraction causes fx mode vibration on the ends of arms 52, 53 in a direction shown with arrows 82, 83 in FIGS. 17A and 17B.

During this condition, when rotation around z-axis is produced as shown in FIG. 18A, Coriolis force is generated in the y-axis direction perpendicular to the vibration direction. As a result the ends of arms 52, 53 starts fy mode vibration having the magnitude proportional to the Coriolis force in the y-axis direction. Each direction of fy mode vibration is shown with arrows 84, 85.

In this case, as shown in FIG. 18B, an electric field E proportional to angular rate of rotation is produced in arms 52, 53 which are vibrating mutually in opposite directions on receiving the Coriolis force. For this reason, by detecting voltage of sensor terminals 86, 87 connected to detecting electrodes 71, 72, 73, 74, 75 and 76, angular rate of rotation can be identified.

In FIG. 19, there is shown a schematic configuration diagram of a sensor circuit for detecting the voltage proportional to fy mode vibration. This sensor circuit includes input terminals 88, 89 connected to sensor terminals 86, 87 of tuning-fork type vibration body 51; terminating resistors 21, 22 connected to input terminals 88, 89; and a differential amplifier 90 to output a signal proportional to the difference of sensor signals being input to terminals 88, 89. The sensor circuit further includes a synchronous detector 91 provided for the synchronous detection of the signal output from differential amplifier 90; an oscillator 82 for feeding a reference clock signal to synchronous detector 91; a low-pass filter (LPF) 92 having a predetermined cutoff frequency fc to cut off high frequency component included in the sensor signal; a direct-current amplifier 93 for amplifying the output of LPF 92; and output terminals 94, 95 to output detecting voltage proportional to angular rate of rotation.

As explained above, in a tuning-fork type vibration gyro, fx mode vibration is produced in arms 52, 53. Angular rate of rotation can be obtained by detecting the voltage proportional to fy mode vibration from detecting electrodes 71, 72, 73, 74, 75 and 76.

However, because tuning-fork type vibration body 51 formed of ferroelectric body is integrally configured, pyroelectric effect appears in the sensor signal as an inherent nature of ferroelectric body. This pyroelectric effect is a characteristic of electric charge generation caused by temperature change.

Namely, in the tuning-fork type vibration gyro, a superposed voltage of the following is detected as detecting voltage; a voltage generated by stress change based on the vibration; and the other voltage (pyroelectric noise) resulting from the pyroelectric effect. Accordingly, in order to detect angular rate of rotation accurately, it is necessary to reduce this pyroelectric noise as much as possible.

In FIGS. 20A and 20B, an explanatory drawing illustrating the pyroelectric noise generation mechanism is shown, as well as a conventional measure therefor. As shown in FIG. 20A(a), ferroelectric body 96 remains in a stable state at a certain temperature with spontaneous polarization P1 produced according to the current temperature. When temperature changes, different spontaneous polarization P2 is produced, to set ferroelectric body 96 to a stable state.

On the surface of ferroelectric body 96, charges corresponding to the spontaneous polarization P1, P2 are stored. Therefore, when temperature changes, the charges staying on the surface of the ferroelectric body either migrate to other ferroelectric body 96 or disappear after combined with other charges having reverse polarity, as shown in FIG. 20A(b). In this case, when charges of reverse polarity are combined abruptly, pyroelectric noise is produced resulting in signal-to-noise ratio deterioration of the tuning-fork type vibration gyro.

To cope with the above-mentioned problem, there has been known as shown in FIG. 20B that the surface of ferroelectric body 96 be covered with a high resistance film 97, formed of CrSi or the like, to suppress the pyroelectric noise generation. The reason is that high resistance film 97 enables the remainder charges on the surface of ferroelectric body 96 to be discharged gradually. Thus the pyroelectric noise generation is prevented.

However, to cover the surface of ferroelectric body 96 with high resistance film 97 requires additional process to the conventional process of manufacturing tuning-fork type vibration body 51. This may well bring about increasing production cost. In addition, because high impedance resonance of ferroelectric body 96 is used in the tuning-fork type vibration gyro, covering the surface of ferroelectric body 96 with high resistance film 97 greatly reduces detecting voltage, as well as deteriorates frequency characteristics. Furthermore, affected by surrounding humidity, the resistance value of high resistance film 97 may deviate, which degrades reproducibility.

SUMMARY OF THE INVENTION

Accordingly, it is an object of the present invention to provide a tuning-fork type vibration gyro and an electrode trimming method therefor, enabling to suppress pyroelectric noise caused by temperature change and to obtain sensor output having high signal-to-noise ratio.

In order to attain the above-mentioned object, one aspect of the present invention is that, in a tuning-fork type vibration gyro, there are provided a tuning-fork type vibration body having two arms disposed in parallel and a base for commonly supporting each one end of the arms, and a longitudinal direction of the two arms is defined as a z-axis and a perpendicular direction thereto is defined as an x-axis; driving electrodes respectively formed on the two arms for generating vibration of the two arms in parallel with the x-axis; detecting electrodes respectively formed on the two arms for detecting electromotive force generated when the tuning-fork type vibration body is rotated around the z-axis; and dummy electrodes formed on the two arms in respective areas different from the driving electrodes and the detecting electrodes.

Another aspect of the present invention is that, in a tuning-fork type vibration gyro, there are provided a tuning-fork type vibration body having three or more arms disposed in parallel and a base for commonly supporting each one end of the arms, and a longitudinal direction of the three or more arms is defined as a z-axis and a perpendicular direction thereto, is defined as an x-axis; driving electrodes formed on at least two arms of the three or more arms for generating vibration of the two arms in parallel with the x-axis; detecting electrodes formed on at least one arm of the three or more arms, for detecting electromotive force generated when the tuning-fork type vibration body is rotated around the z-axis; and dummy electrodes formed on the three or more arms in respective areas different from the driving electrodes and the detecting electrodes.

According to the present invention, the dummy electrodes on the surface of the arms enable to average the surface potential of the ferroelectric body, thus eliminating high potential portion. Therefore, even when temperature change produces excessive amount of charges, dielectric breakdown on the surface of the ferroelectric body can be avoided. Thus generation of pyroelectric noise can be suppressed and the tuning-fork type vibration gyro having high signal-to-noise ratio can be obtained.

Furthermore, as a preferred embodiment of the present invention, driving electrodes and detecting electrodes are disposed in mutually deviating positions against z-axis.

According to the invention, because the driving electrodes and the detecting electrodes are disposed in mutually deviating positions against z-axis, it is possible to prevent misidentification of a driving electrode against a detecting electrode during the electrode trimming process in manufacturing of the tuning-fork type vibration gyro.

To achieve the above-mentioned object, yet another aspect of the present invention is that, in a tuning-fork type vibration gyro having a sensor circuit to which a sensor signal generated by a tuning-fork type vibration body is input, the sensor circuit includes; a differential amplifier to which the sensor signal is input; and a capacitor or a voltage limiting element being connected to input terminals of the differential amplifier.

According to the invention, pyroelectric noise input to the differential amplifier can be reduced by a capacitor or other voltage limiting element connected to the input or other voltage limiting element connected to the input terminals of the differential amplifier. This enables to improve signal-to-noise ratio of the tuning-fork type vibration gyro.

As a preferred embodiment of the invention, the differential amplifier includes a first stage transistor having differential connection, and a guard electrode for separating the first stage transistor from transistors in the succeeding stages.

According to the invention, a transistor in the first stage of the differential amplifier is separated from transistors in the succeeding stages. This can prevent pyroelectric noise from transmitting to the succeeding stages, enabling to improve signal-to-noise ratio of the tuning-fork type vibration gyro.

To achieve the above-mentioned object, still another aspect of the present invention is that an electrode trimming method is provided for a tuning-fork type vibration gyro having two or more arms and a base for supporting the arms, driving electrodes and detecting electrodes formed on the arms, and a support substrate for supporting the tuning-fork type vibration body on the base. When defining an x-axis as a direction of the arms disposed in parallel, the electrode trimming method includes the steps of; suppressing vibration of the support substrate while vibration of the arms in parallel with the x-axis is being excited by applying a predetermined drive power to the driving electrode; and adjusting an area of the detecting electrode so as to decrease a sensor signal output from the detecting electrode.

According to the invention, because the vibration of support substrate is suppressed, thus suppressing the parasitic vibration induced to the arms, only leak Ax resulting from the vibration parallel with x-axis (i.e. fx mode vibration) can be extracted. This enables to trim the imbalance of detecting electrode areas accurately.

Further scopes and features of the present invention will become more apparent by the following description of the embodiments with the accompanying drawings.

DETAILED DESCRIPTION OF THE PREFERRED EMBODIMENTS

The preferred embodiments of the present invention are described hereinafter referring to the charts and drawings.

Figure 1:
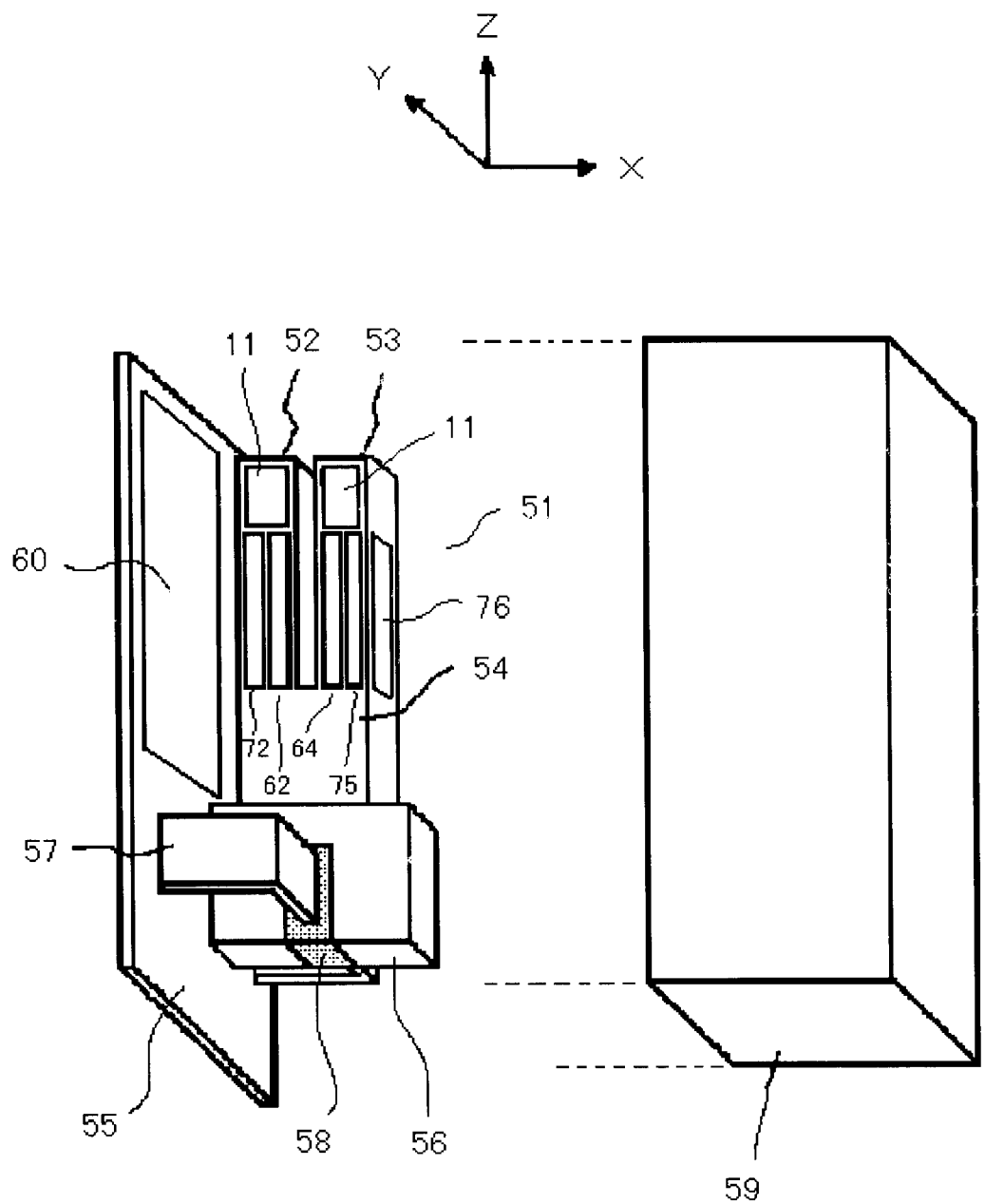
FIG. 1 is a schematic configuration diagram of a tuning-fork type vibration gyro according to an embodiment of the present invention.
Figure 15:
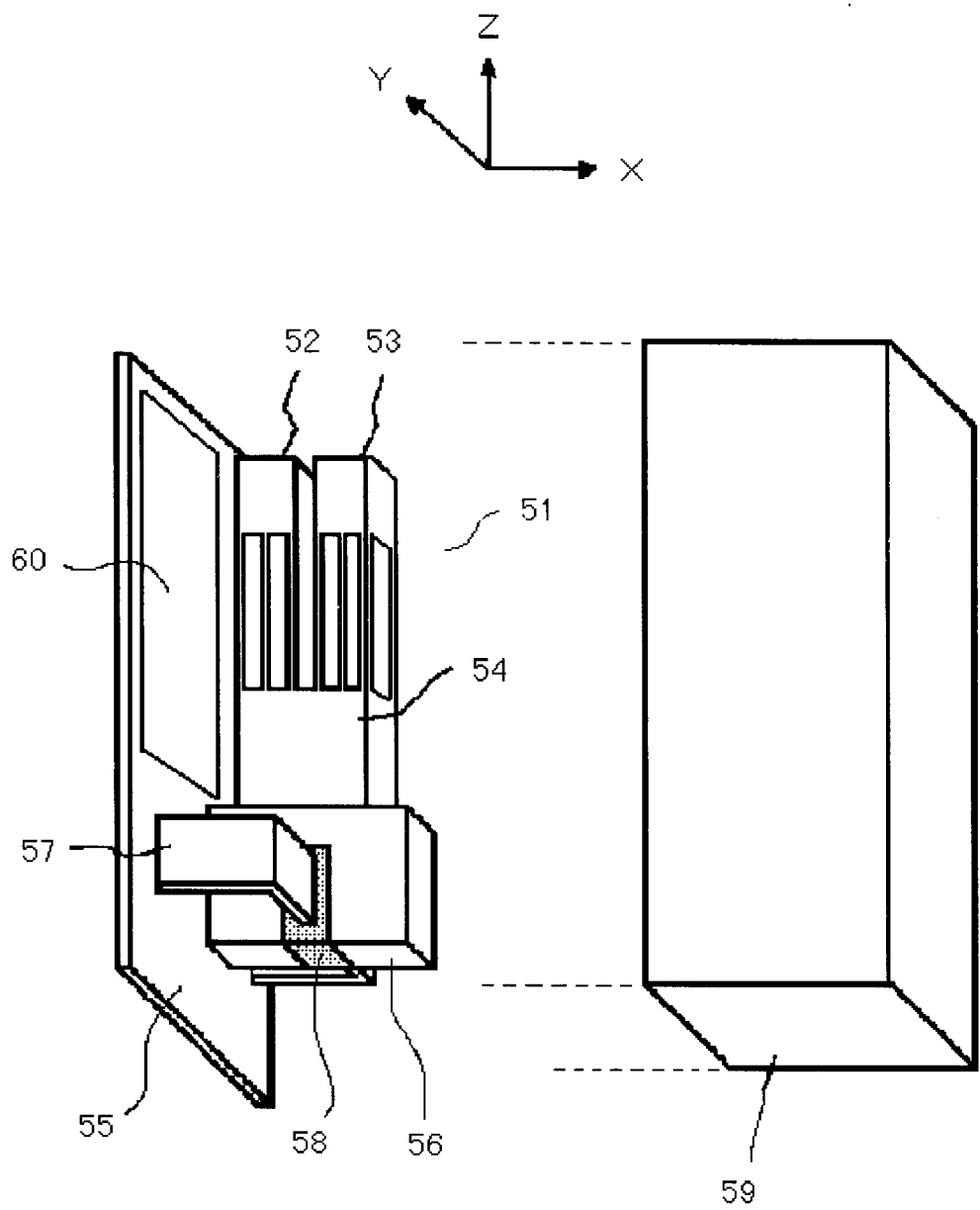
FIG. 15 is a schematic configuration diagram of a tuning-fork type vibration gyro.
Figure 16A:
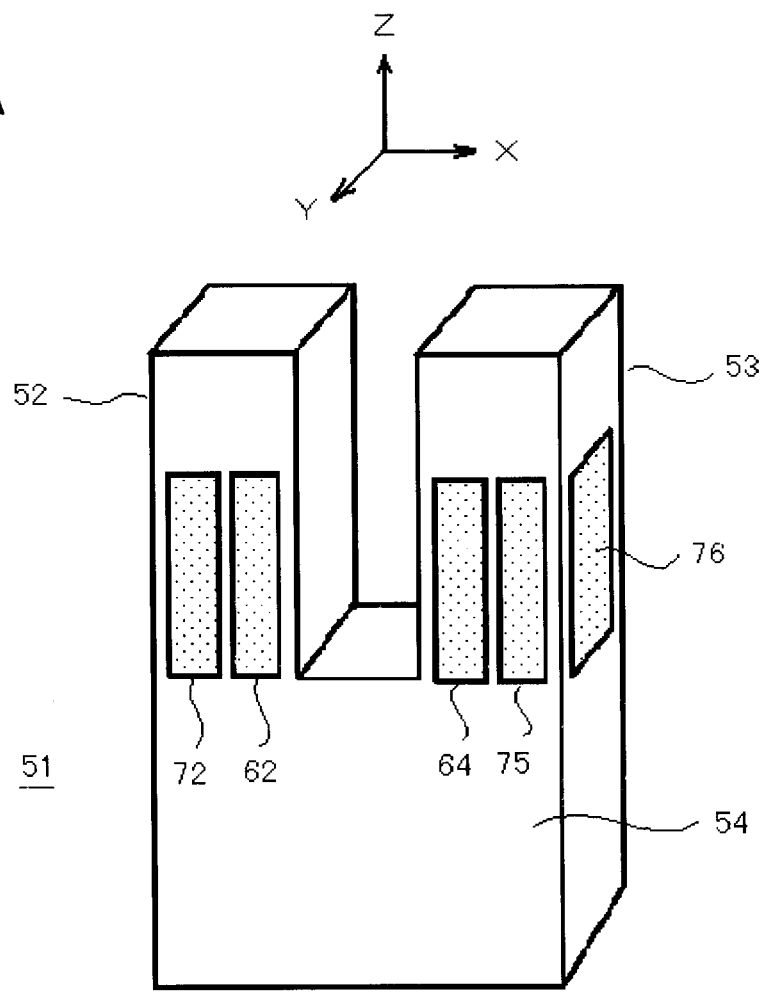
FIGS. 16A and 16B are explanatory diagrams of electrode configuration in a tuning-fork type vibration body.
Figure 16B:
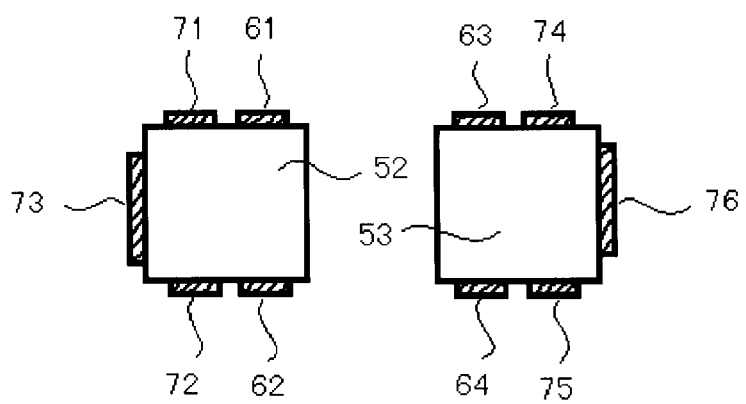
Figure 17A:
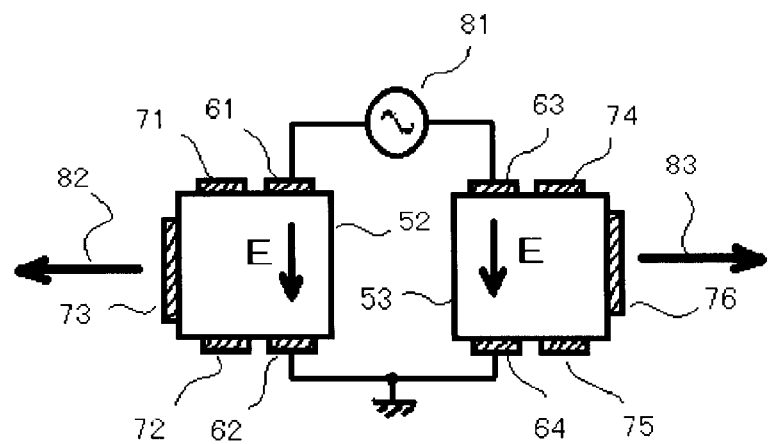
FIGS. 17A and 17B are explanatory diagrams of fx mode vibration in a tuning-fork type vibration body.
Figure 17B:
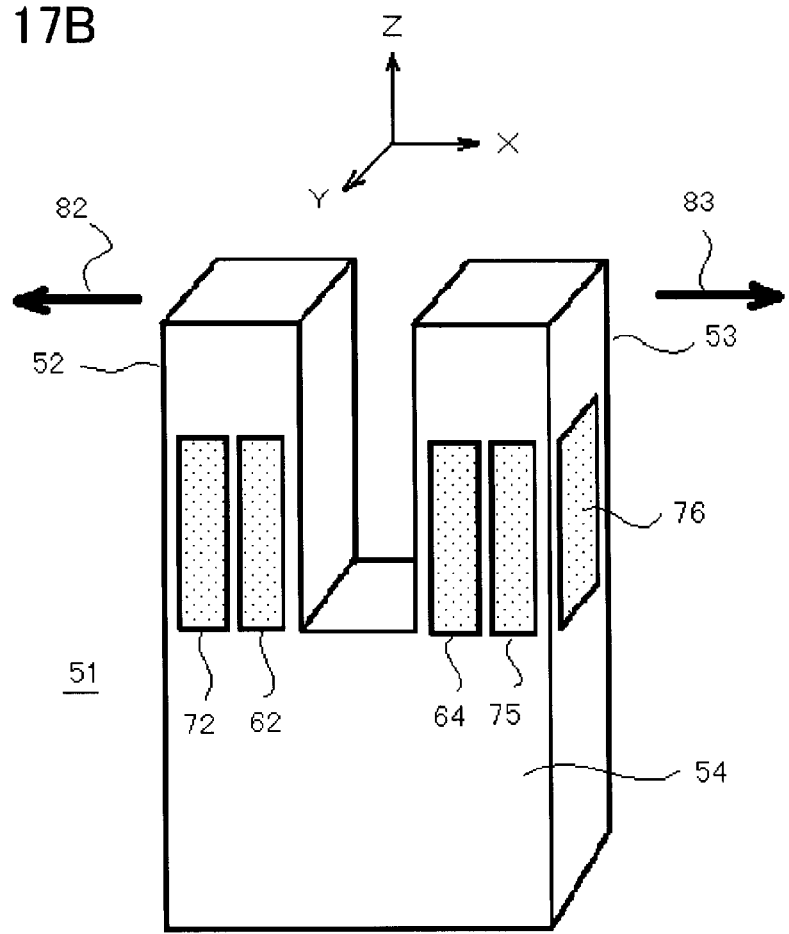

FIG. 1 shows a schematic configuration diagram of a tuning-fork type vibration gyro according to an embodiment of the present invention. The tuning-fork type vibration gyro is provided with tuning-fork type vibration body 51 integrally formed of ferroelectric body such as lithium tantalate ($LiTaO_3$), lithium niobate ($LiNbO_3$), or the like. In tuning-fork type vibration body 51, there are provided driving electrodes 62, 64, etc. and detecting electrodes 72, 75, 76, etc., as well as dummy electrodes 11 on the surface of two arms 52, 53 so as to reduce pyroelectric noise. Other configuration of the tuning-fork type vibration gyro is substantially the same as the conventional configuration shown in FIG. 15.

Figure 2A:
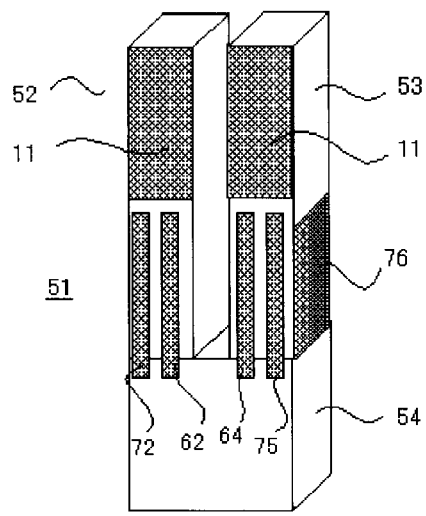
FIGS. 2A through 2C are explanatory diagrams of an electrode configuration according to the invention.
Figure 2B:
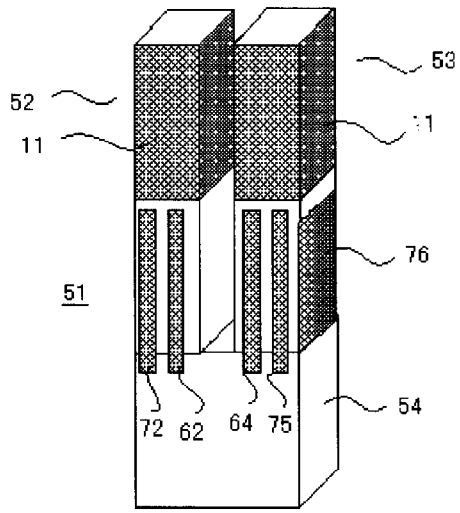
Figure 2C:
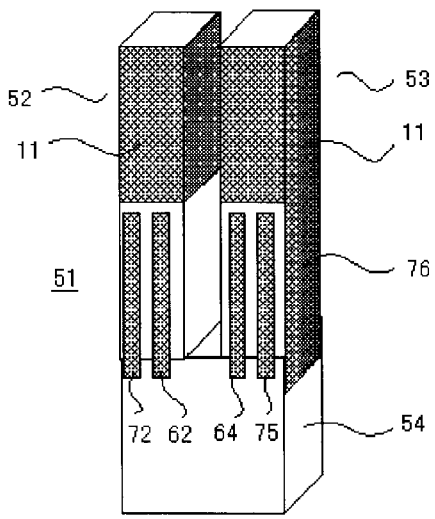

In FIGS. 2A through 2C, there are shown explanatory diagrams of an electrode configuration in tuning-fork type vibration body 51 according to an embodiment of the present invention. In FIG. 2A, one type of dummy electrodes provided in two planes (hereinafter referred to as 'two-plane dummy electrode type') is shown, in which dummy electrodes are disposed on both the front and rear surfaces of the end disposed on both the front and rear surfaces of the end portions of arms 52, 53 in tuning-fork type vibration body 51.

According to this embodiment, dummy electrodes 11 are provided for leveling the surface voltage of the ferroelectric body to eliminate high potential portion. Accordingly dielectric breakdown on the surface of the ferroelectric body can be avoided even when charges on the surface of the ferroelectric body becomes excessive caused by temperature change. Thus a tuning-fork type vibration gyro having high signal-to-noise (SN) ratio with reduced pyroelectric noise can be obtained.

In FIG. 2B another type of dummy electrodes provided on four planes (hereinafter referred to as 'four-plane dummy electrode type') is shown, in which dummy electrodes are disposed on the front, rear, right and left surfaces of the end portions of arms 52, 53 in tuning-fork type vibration body 51.

According to this embodiment, dummy electrodes 11 are disposed in wide areas of the surfaces of arms 52, 53 formed of ferroelectric body, to neutralize charges on the surface of the ferroelectric body eliminating high potential portion. Accordingly dielectric breakdown on the surface of the ferroelectric body can be avoided even when charges on the surface of the ferroelectric body becomes excessive caused by temperature change. Thus pyroelectric noise is reduced and a tuning-fork type vibration gyro having high SN ratio can be obtained.

In FIG. 2C, yet another type of tuning-fork type vibration body 51 is shown. In this type, four-plane dummy electrodes are integrally formed with detecting electrodes. Namely, dummy electrodes 11, disposed on the front, rear, right and left surfaces of the end portions of arms 52, 53, are connected to detecting electrodes 73, 76.

Figure 19:
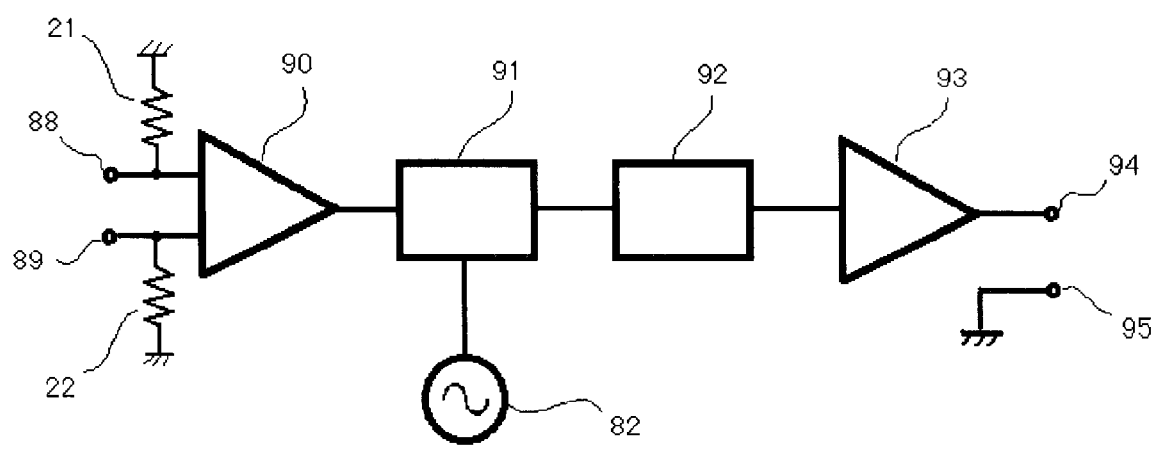
FIG. 19 is a schematic configuration diagram of a sensor circuit in a tuning-fork type vibration gyro. pyroelectric noise generation mechanism and a conventional measure therefor.
Figure 20A:
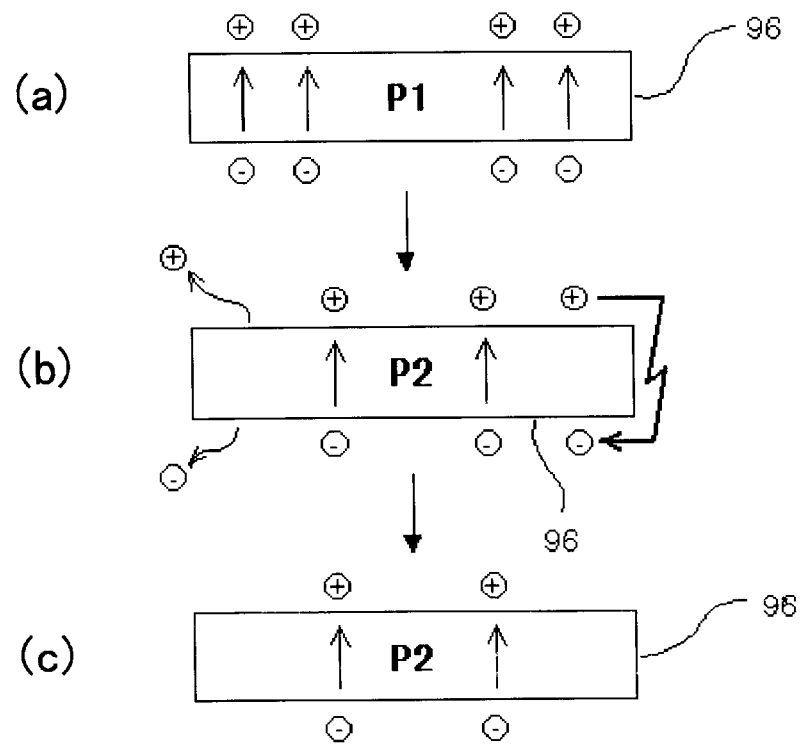
FIGS. 20A and 20B are explanatory diagrams of pyroelectric noise generation mechanism and a conventional measure therefor.
Figure 20B:
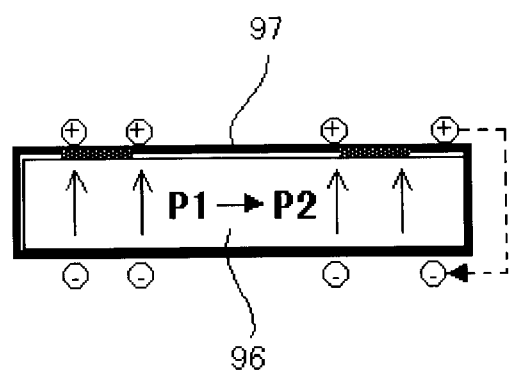

According to this embodiment, dummy electrodes 11 neutralize charges on the surface of the ferroelectric body, and moreover excess charges are discharged to a ground line through terminating resistors 21, 22 connected to detecting electrodes 73, 76 (refer to FIG. 19). Accordingly dielectric breakdown on the surface of the ferroelectric body can be avoided even when charges on the surface of the ferroelectric body becomes excessive caused by temperature change. Thus pyroelectric noise can be reduced and a tuning-fork type vibration gyro having high SN ratio can be obtained.

Figure 3:
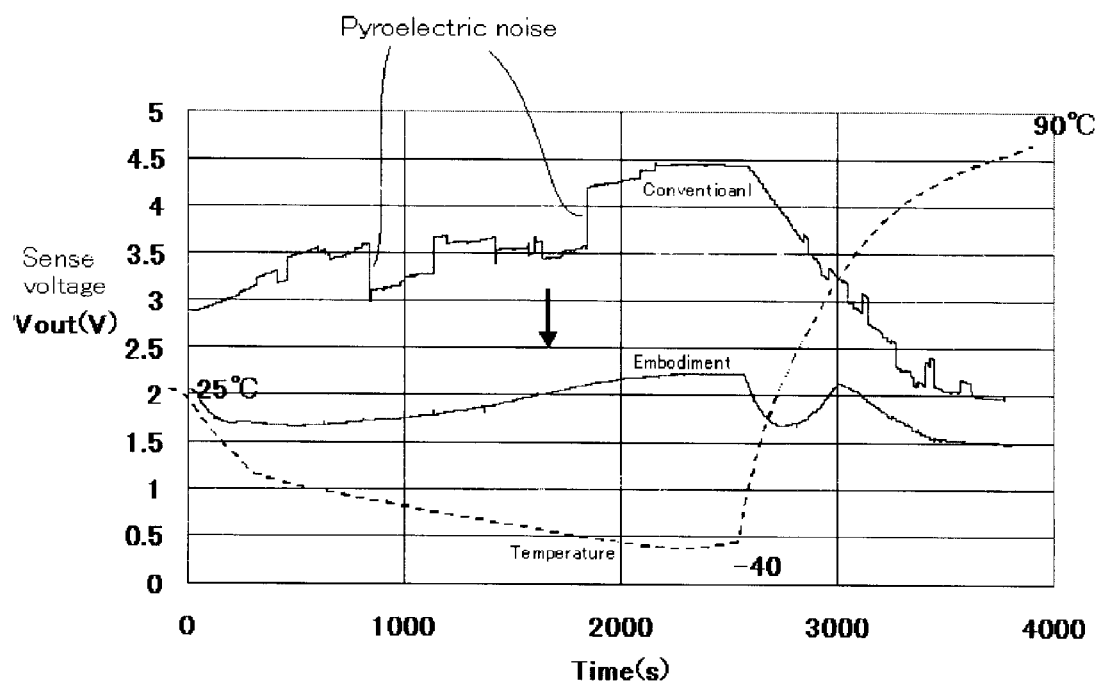
FIG. 3 is an explanatory diagram of detecting voltage change according to the invention.

In FIG. 3, there is shown an explanatory diagram of pyroelectric noise included in detecting voltage. In this figure, an embodiment example of dummy electrode 11 is compared with a conventional example having no dummy electrode 11, in which the change in pyroelectric noise is shown as the temperature changes from 25° C. to −40° C. then to 90° C. with the lapse of time. In FIG. 3, the pyroelectric noise is shown by step difference of detecting voltage level.

As shown in FIG. 3, in a conventional example having no dummy electrode 11, there arises step difference in a detecting voltage which indicates generation of pyroelectric noise. On the other hand, in the embodiment of the present invention having dummy electrode 11, the detecting voltage continuously changes indicating no pyroelectric noise is generated.

Thus, according to the embodiment of the present invention, charges generated on the surface of the ferroelectric body can be neutralized by dummy electrode 11 to reduce the pyroelectric noise and thus to improve SN ratio of the tuning-fork type vibration gyro.

Figure 4:
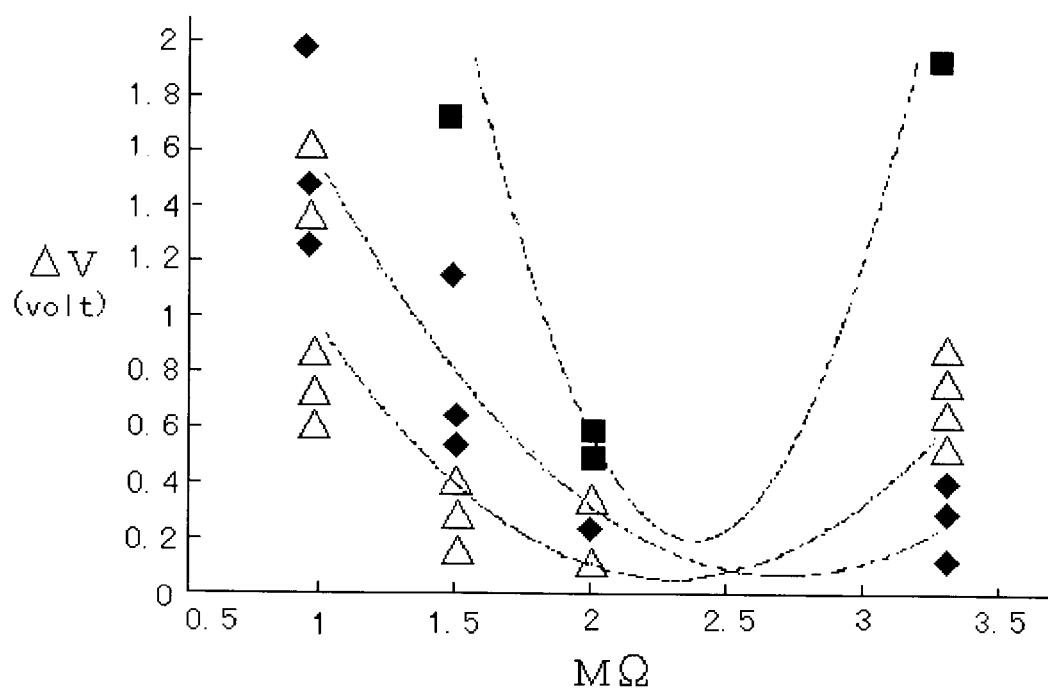
FIG. 4 is a characteristic diagram of pyroelectric noise according to the invention.

In FIG. 4, there is shown a characteristic diagram indicating magnitude of pyroelectric noise ΔV included in the detecting voltage. Changes in pyroelectric noise ΔV are shown with the change of the value of terminating resistors 21, 22 (refer to FIG. 19) connected to the detecting electrode.

In FIG. 4, pyroelectric noise ΔV in case of two-plane dummy electrode type is shown with black lozenges ♦, and pyroelectric noise ΔV in case of four-plane dummy electrode type is shown with white triangles Δ. For the sake of comparison, pyroelectric noise ΔV in case of conventional type having no dummy electrode is shown with black squares ■.

As shown in FIG. 4, by providing dummy electrode 11 in tuning-fork type vibration body 51, it is possible to reduce pyroelectric noise ΔV enabling to obtain a tuning-fork type vibration gyro having high SN ratio.

In the above embodiment, the description is given in regard to the case of tuning-fork type vibration body 51 having two arms. It is also possible to apply the method according to the present invention to other tuning-fork type vibration body 51 having three or more arms, enabling to decrease pyroelectric noise ΔV to obtain a tuning-fork type vibration gyro having high SN ratio.

Figure 18A:
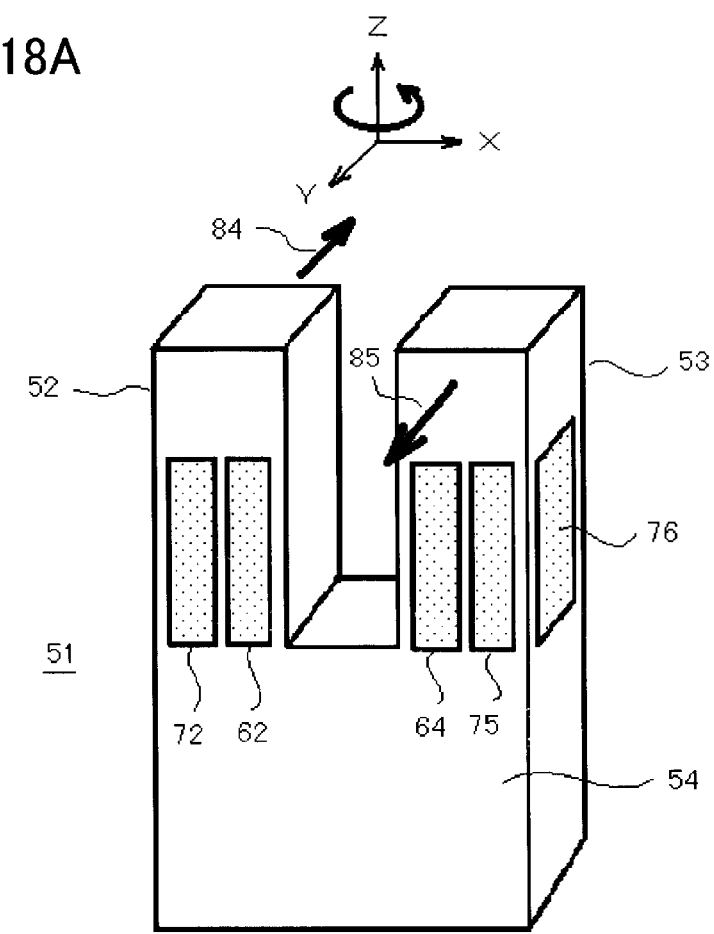
FIGS. 18A and 18B are explanatory diagrams of fy mode vibration in a tuning-fork type vibration body.
Figure 18B:
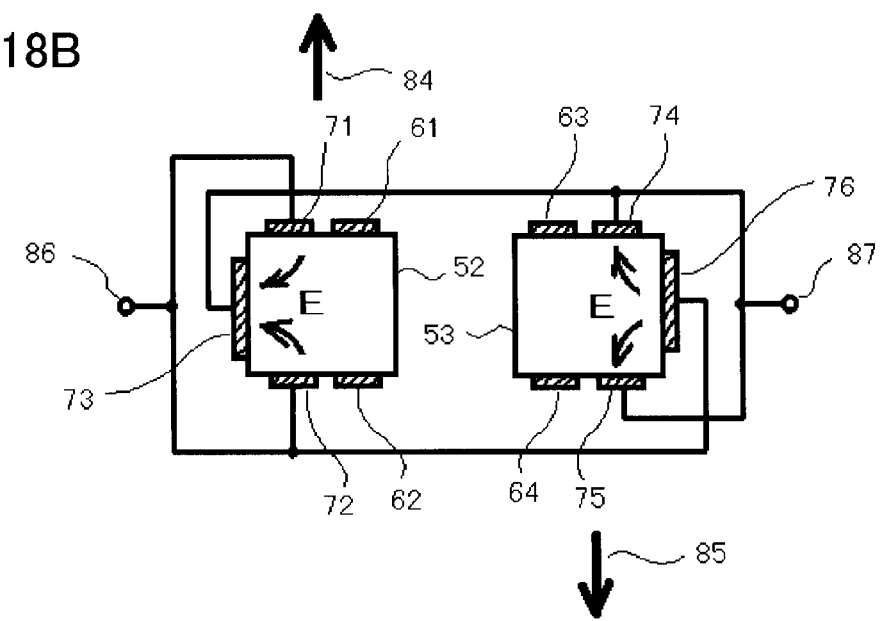

More specifically, in the case of a tuning-fork type vibration body 51 having two arms, fy, mode vibration is generated as shown with arrows in FIG. 18(1), to produce rotating vibration corresponding to fy mode vibration on a base 54. As explained below using FIGS. 5 and 6, it is possible to cancel the rotating vibration produced on base 54 when using a tuning-fork type vibration body 51 having three or more arms.

Figure 5A:
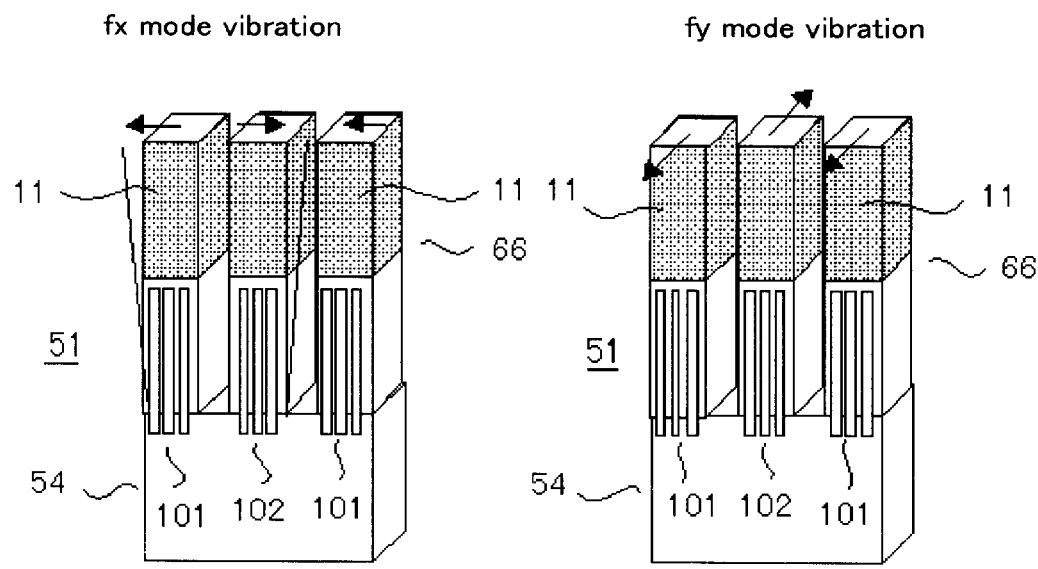
FIGS. 5A and 5B are explanatory diagrams of an electrode configuration according to the invention.

In FIG. 5, there is shown an explanatory diagram of an electrode configuration in the case of tuning-fork type vibration body 51 having three arms. According to the embodiment of tuning-fork type vibration body 51 shown in FIG. 5A, three arms 66 and base 54 are integrally configured. Driving electrodes 101 are disposed on respective side arms 66, and also detecting electrode 102 is disposed on a center arm 66. At the ends of three arms 66, dummy electrodes 11 are disposed.

Figure 5B:
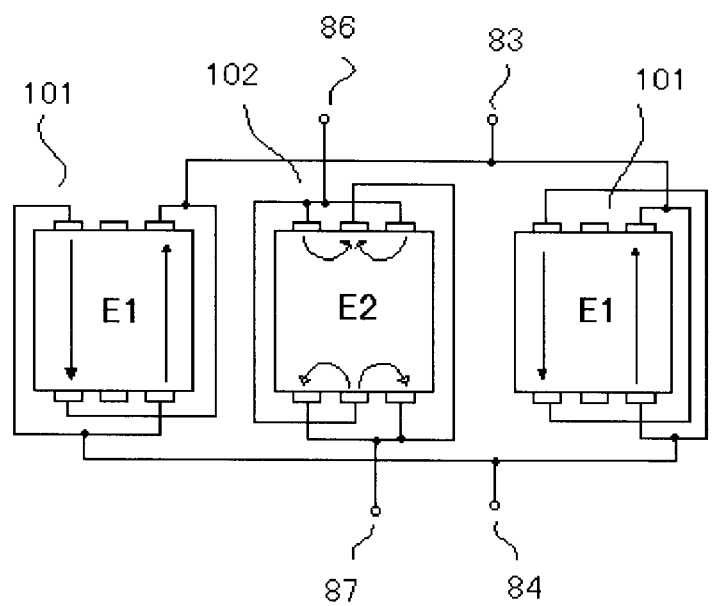

Driving electrodes 101 and detecting electrode 102 are connected as shown in FIG. 5B. By connecting the aforementioned oscillator 81 to driving terminals 83, 84 which are connected to driving electrodes 101, an electric field E1 is generated on each side arm 66. This electric field E1 produces fx mode vibration in tuning-fork type vibration body 51, as shown in FIG. 5A(a).

When tuning-fork type vibration body 51 rotates in this condition, there arises Coriolis force on tuning-fork type vibration body 51 to produce fy mode vibration as shown in FIG. 5A(b). Thus an electric field E2 is generated on central arm 66 as shown in FIG. 5B.

In this case, as shown in FIG. 5A(b), fy mode vibration generated in each side arm and the central arm vibrates mutually in opposite directions, enabling to cancel the vibration produced on base 54. Further, by detecting this electric field E2, it is possible to extract through sensor terminals 86, 87 a voltage corresponding to the angular rate of rotation.

Figure 6A:
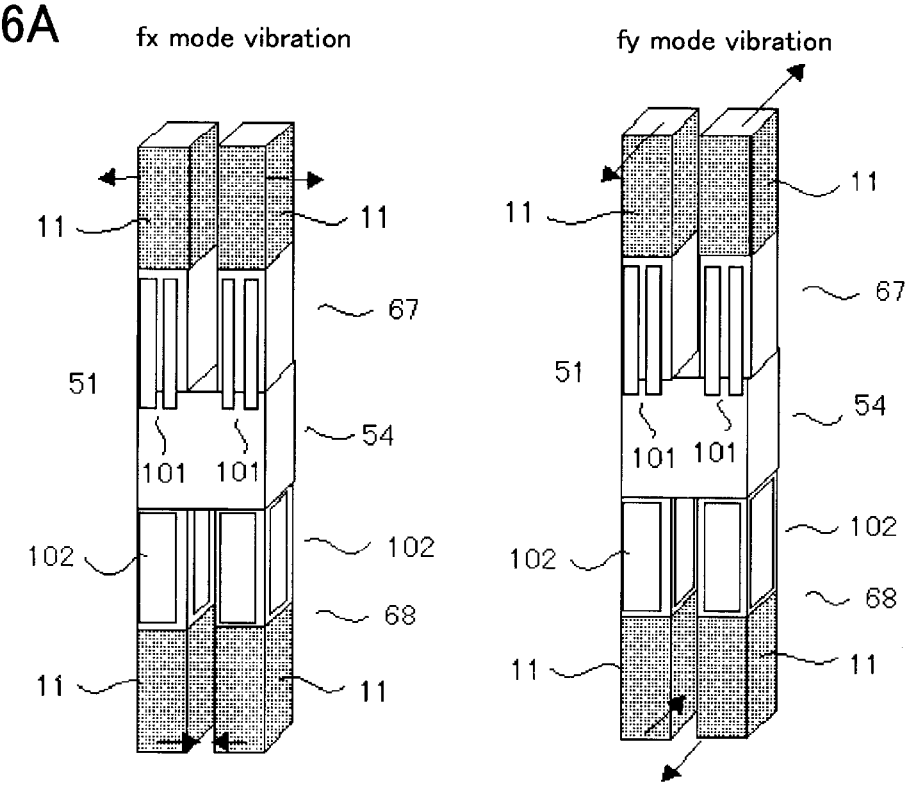
FIGS. 6A and 6B are explanatory diagrams of an electrode configuration according to the invention.

In FIG. 6, an explanatory diagram illustrating an electrode configuration of tuning-fork type vibration body 51 having four arms. As shown in FIG. 6A, tuning-fork type vibration body 51 according to the embodiment is provided with upper arms 67 and lower arms 68 integrally formed with base 54. Driving electrodes 101 are disposed on upper arms 67, and also detecting electrodes 102 are disposed on lower arms 68. At the ends of both upper arms 67 and lower arms 68, dummy electrodes 11 are provided.

Figure 6B:
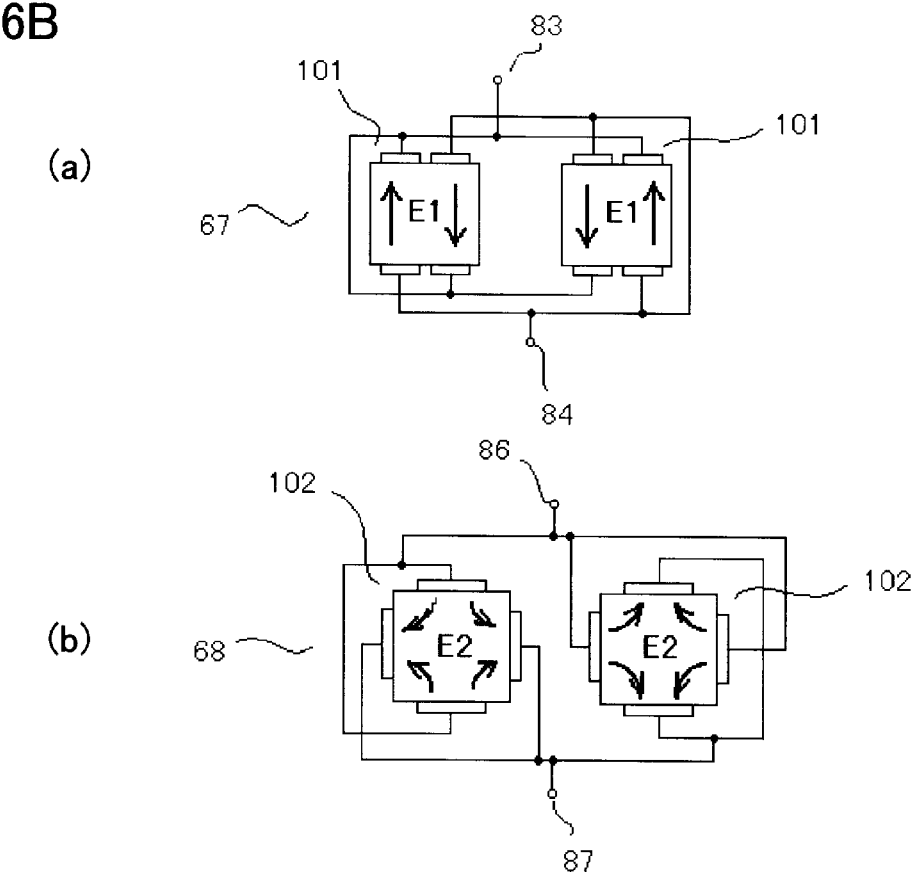

Driving electrodes 101 provided on upper arms 67 and detecting electrodes 102 provided on lower arms 68 are connected as shown in FIG. 6B. By connecting the aforementioned oscillator 81 to driving terminals 83, 84 connected to driving electrodes 101, an electric field E1 is generated in upper arms 67. This electric field E1 produces fx mode vibration in both upper arms 67 and lower arms 68, as shown in FIG. 6A(a).

When tuning-fork type vibration body 51 rotates in this condition, Coriolis force arises on tuning-fork type vibration body 51 to produce fy mode vibration, as shown in FIG. 6A(b). Thus an electric field E2 is generated in lower arms 68, as shown in FIG. 6B.

In this case, as shown in FIG. 6A(b), fy mode vibration produced in upper arms 67 and lower arms 68 vibrate mutually in opposite directions, enabling to cancel the vibration produced on base 54. Further, by detecting this electric field E2, it is possible to extract from sensor terminals 86, 87 a voltage corresponding to the angular rate of rotation.

Accordingly, tuning-fork type vibration body 51 having three or more arms enables to cancel the vibration of base 54 caused by fy vibration. This produces reduced rotating vibration of base 54 compared to the case of tuning-fork type vibration body 51 having only two arms. Therefore tuning-fork type vibration body 51 becomes stable and it becomes easy to support tuning-fork type vibration body 51.

Also in case of tuning-fork type vibration body 51 having three or more arms, it is possible to provide dummy electrodes 11 at the end of arms to reduce pyroelectric noise ΔV. Therefore a tuning-fork type vibration gyro having high SN ratio may be obtained.

Next, an example of preventing pyroelectric noise from being input to a sensor circuit is explained hereinafter. In FIG. 7, there is shown an explanatory diagram of a sensor circuit according to an embodiment of the present invention. As mentioned earlier, a ferroelectric body produces pyroelectric noise as temperature changes. In this embodiment, it is aimed to prevent the pyroelectric noise from being input to the sensor circuit so as to improve SN ratio of the tuning-fork type vibration gyro.

Figure 7A:
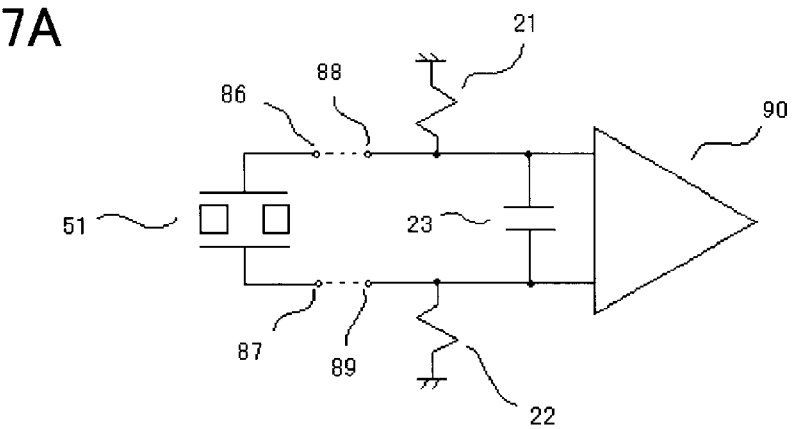
FIGS. 7A through 7C are explanatory diagrams of a sensor circuit according to the invention.

The sensor circuit according to the embodiment is provided with terminating resistors 21, 22 connected to input terminals of a first stage differential amplifier 90 as shown in FIG. 7A. Also a capacitor 23 is connected so that pyroelectric noise from tuning-fork type vibration body 51 to differential amplifier 90 may be blocked. Other portions of the sensor circuit is identical to the configuration shown in FIG. 19.

According to this embodiment, only pyroelectric noise, which consists of high frequency component in sensor signal, passes through capacitor 23. Thus pyroelectric noise to differential amplifier 90 is blocked, enabling to improve SN ratio of the tuning-fork type vibration gyro.

Figure 7B:
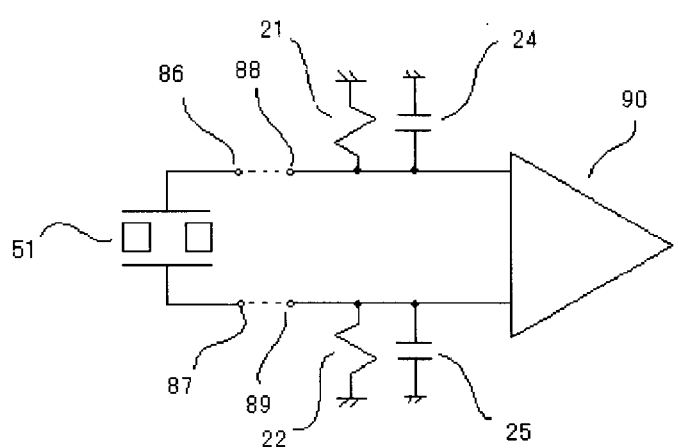

In FIG. 7B, there is shown a configuration diagram of a sensor circuit according to another embodiment. In this embodiment, capacitors 24, 25 as well as terminating resistors 21, 22 are connected between input terminals 88, 89 of first stage differential amplifier 90 and a ground line.

According to this embodiment, only pyroelectric noise consisting of high frequency component in sensor signal may be flowed to the ground line. Thus a tuning-fork type vibration gyro having improved SN ratio may be obtained.

Figure 7C:
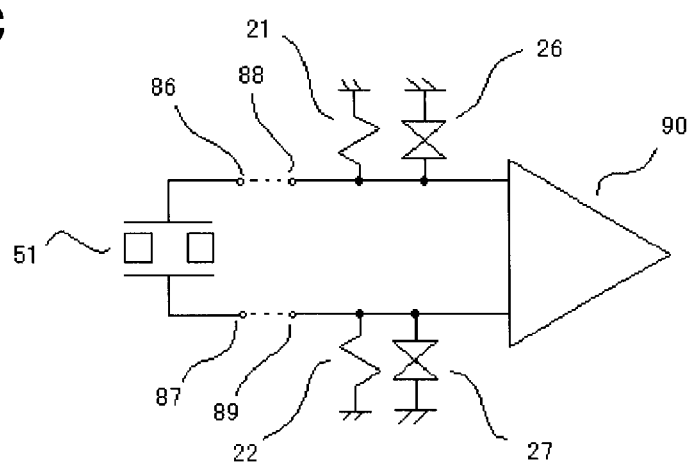

Further, in FIG. 7C, there is shown a configuration diagram of a sensor circuit according to yet another embodiment. In this embodiment, there are provided voltage limiting elements, such as varistors 26, 27, in addition to terminating resistors 21, 22, connected between input terminals 88, 89 of first stage differential amplifier 90 and a ground line. According to this embodiment, the magnitude of pyroelectric noise can be limited by the voltage limiting elements. Thus a tuning-fork type vibration gyro having improved SN ratio may be obtained.

Figure 8A:
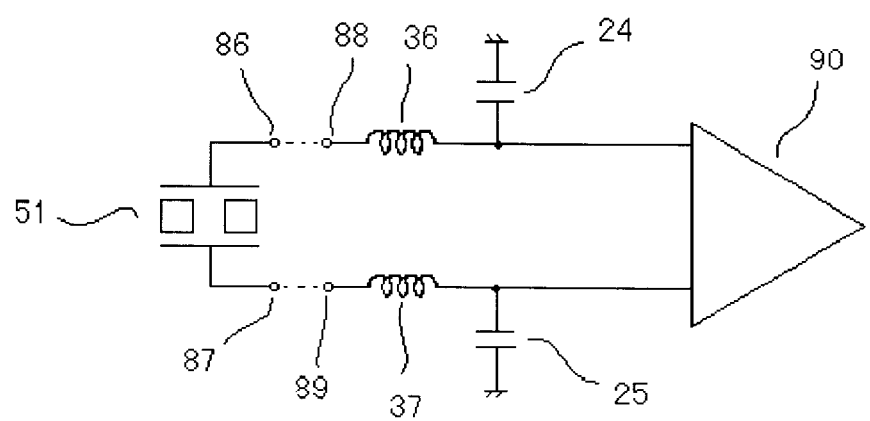
FIGS. 8A and 8B are explanatory diagrams of a sensor circuit according to the invention.
Figure 8B:
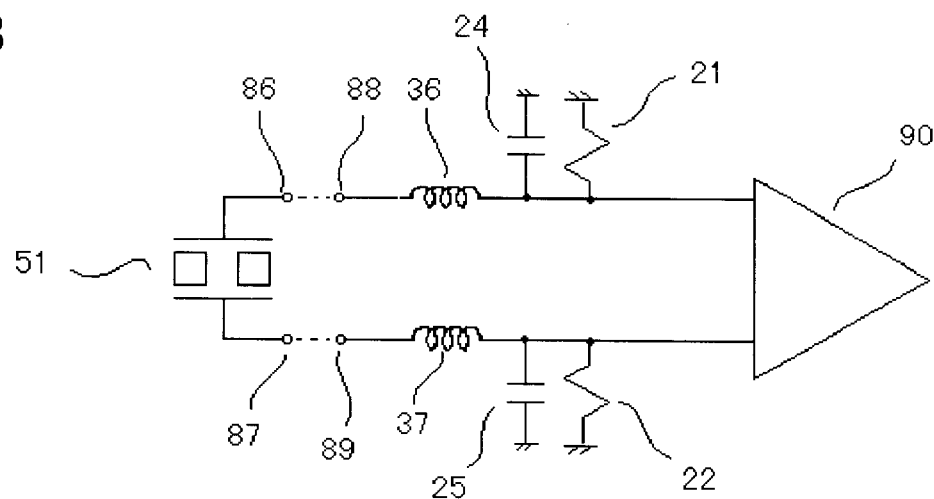

Still further, in FIGS. 8A and 8B, a configuration diagram of a sensor circuit according to yet another embodiment is shown. In this embodiment, in addition to capacitors 24, 25, inductors 36, 37 are connected to input terminals 88, 89 of first stage differential amplifier 90.

According to this embodiment, pyroelectric noise output from tuning-fork type vibration body 51 is blocked by inductance 36, 37 so as not to input to differential amplifier 90, thus a tuning-fork type vibration gyro having improved SN ratio can be obtained.

Figure 9:
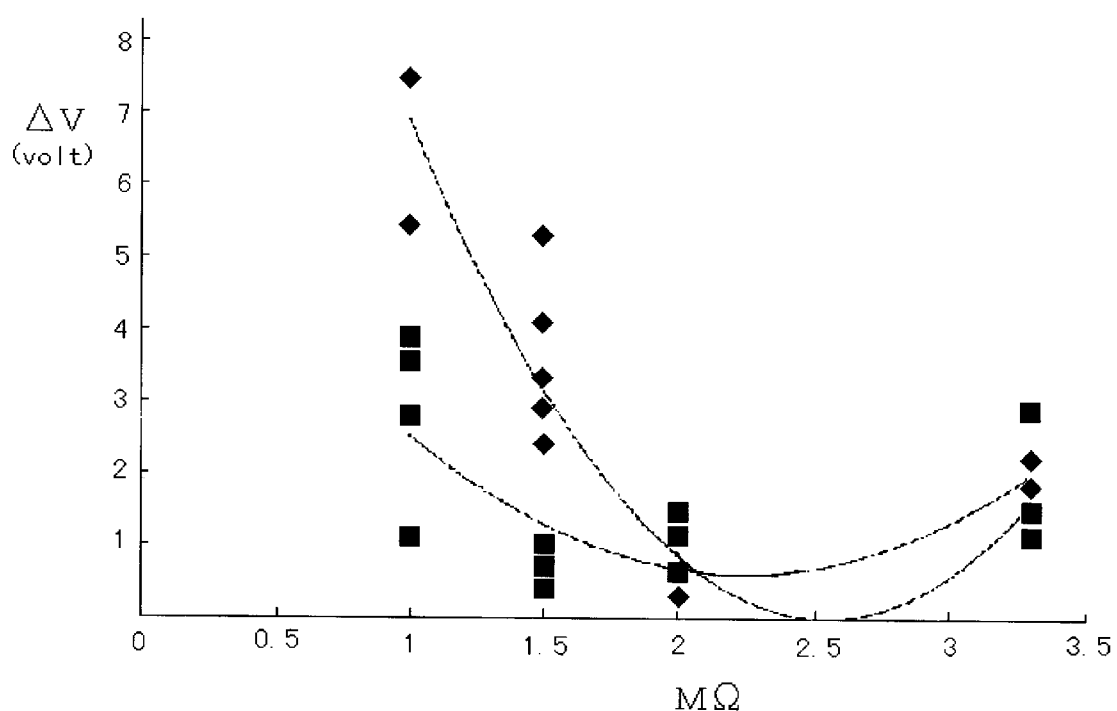
FIG. 9 is a characteristic diagram of pyroelectric noise according to the invention.

In FIG. 9, there is shown a characteristic diagram of pyroelectric noise ΔV of the sensor circuit shown in FIG. 7A or FIG. 7C. In FIG. 9, a characteristic in case that capacitor 23 is set to 10 pF in the sensor circuit in FIG. 7A is shown with black lozenges ♦, while a characteristic in the sensor circuit in FIG. 7C is shown with black squares ■.

As shown in FIG. 9, according to the embodiment, pyroelectric noise included in the sensor signal can be reduced by means of capacitor 23 or varistors 26, 27. Thus a tuning-fork type vibration gyro having improved SN ratio can be obtained.

Figure 10:
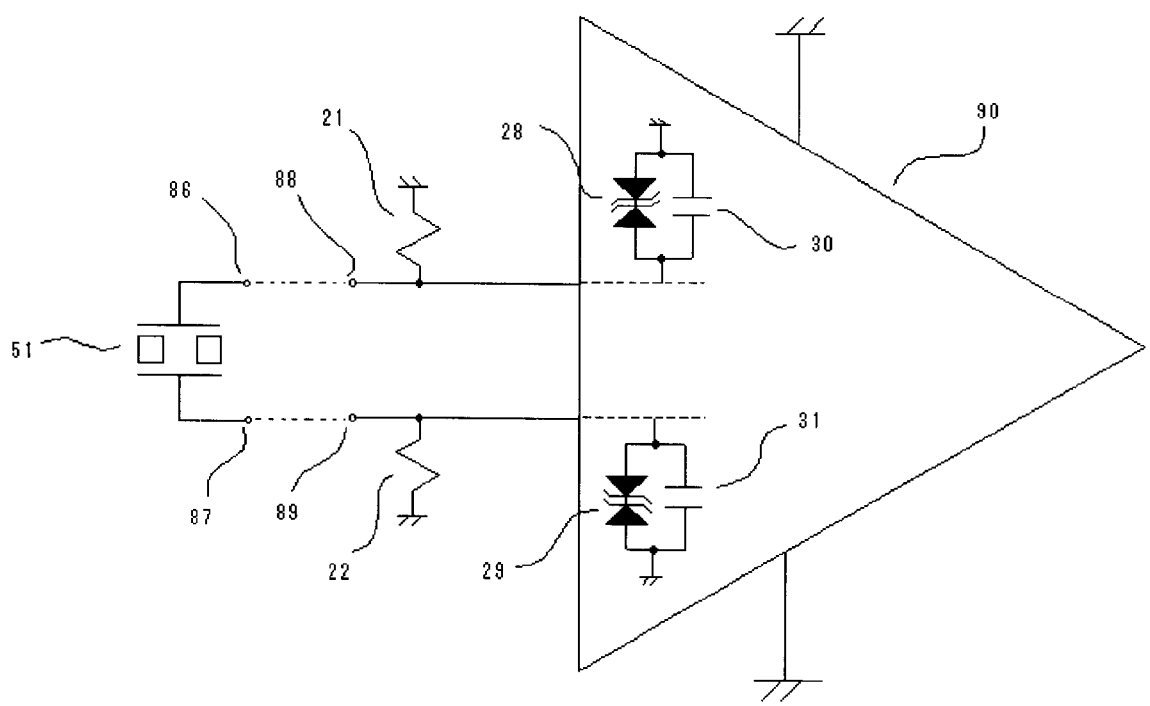
FIG. 10 is an explanatory diagram of a sensor circuit according to the invention.

In FIG. 10, a configuration diagram according to still another embodiment of a sensor circuit is shown. In this embodiment, a capacitor and voltage limiting elements shown in FIG. 7C, as well as differential amplifier 90, are configured in one integrated circuit. In FIG. 10, Zener diodes 28, 29 easily configured in a bipolar integrated circuit are used for the voltage limiting elements.

According to the embodiment, the sensor circuit can be miniaturized. The magnitude of pyroelectric noise can be limited by Zener diodes 28, 29 and pyroelectric noise included in the sensor signal can be flowed to a ground line. Thus a tuning-fork type vibration gyro having improved SN ratio can be obtained.

Figure 11A:
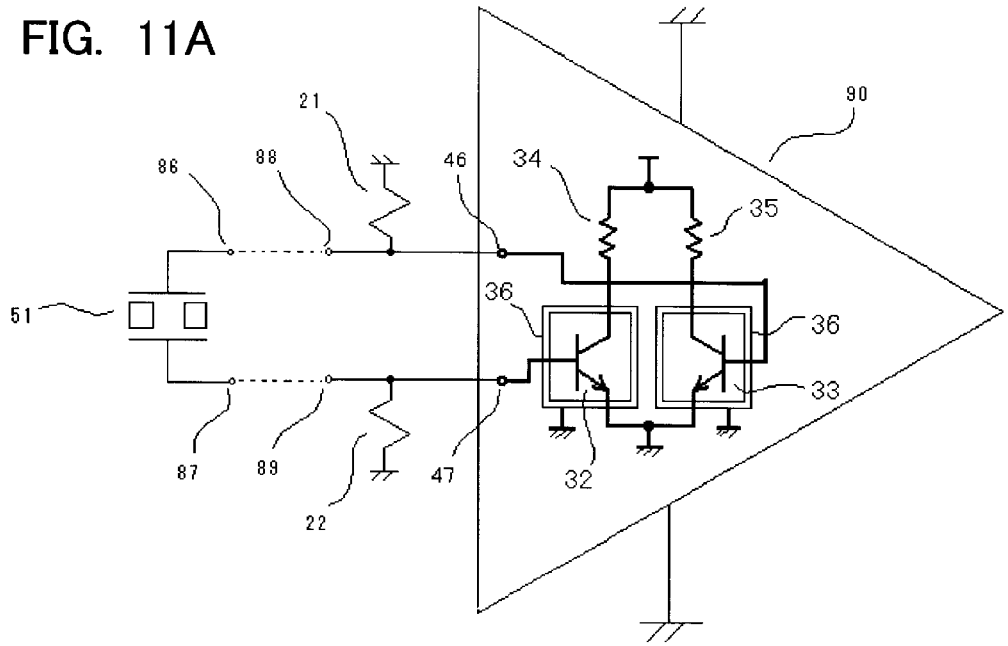
FIGS. 11A through 11C are explanatory diagrams of a sensor circuit according to the invention.
Figure 11B:
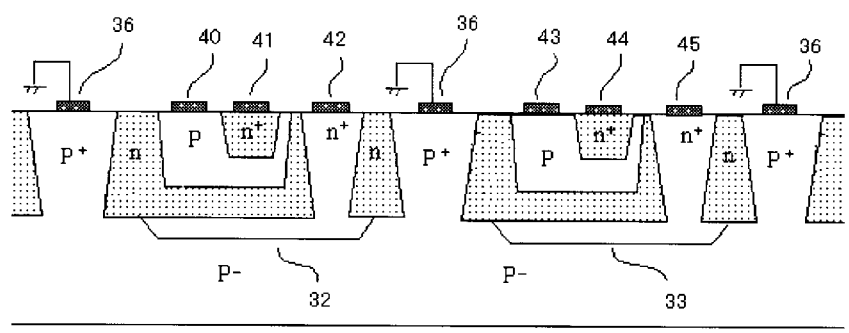
Figure 11C:
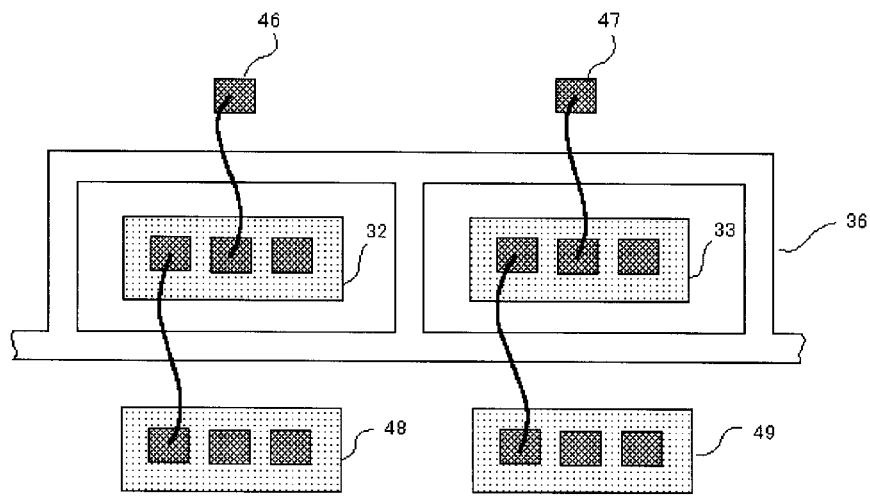

In FIG. 11A, there is shown a configuration diagram of a differential amplifier provided in the sensor circuit according to another embodiment of the present invention. FIG. 11B shows a cross sectional view of the differential amplifier, while FIG. 11C shows a plan view thereof. The embodiment is aimed to separate first stage transistors 32, 33 in differential amplifier 90 from transistors in succeeding stages, so that pyroelectric, noise may be prevented from being transferred to the transistors in the succeeding stages.

As shown in FIG. 11A, bases of first stage transistor 32, 33 in differential amplifier 90 are respectively connected to input pads 46, 47. In other words, pyroelectric noise produced in tuning-fork type vibration body 51 is input to transistors 32, 33 through input pads 46, 47.

Here, according to this embodiment, guard electrodes 36 are provided in differential amplifier 90 so that the first stage transistors 32, 33 may be separated from transistors in the succeeding stage. Guard electrodes 36 are connected to a ground line, enabling pyroelectric noise to flow from guard electrodes 36 to the ground line. Thus it becomes possible to prevent pyroelectric noise from being transferred to transistors in the succeeding stages.

Additionally, each first stage transistors 32, 33 is enclosed by guard electrodes 36 connected to the ground line. This enables to prevent unnecessary mutual coupling between first stage transistors 32, 33, which otherwise may bring about malfunctioning caused by pyroelectric noise.

Figure 12:
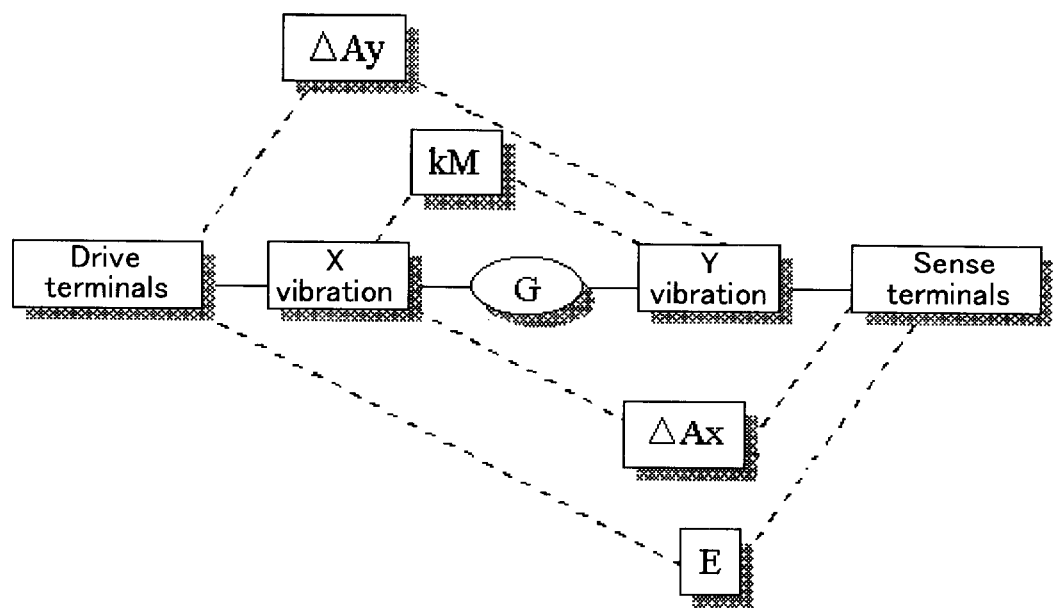
FIG. 12 is an explanatory diagram of coupling relations between driving electrodes and detecting electrodes.

Now, further description is given hereinafter in regard to a coupling relation between driving electrodes and detecting electrodes in the electrode trimming of a tuning-fork type vibration gyro. In FIG. 12, there is shown an explanatory diagram illustrating the coupling relation between driving electrodes and detecting electrodes in tuning-fork type vibration body 51. As shown with solid lines in FIG. 12, fy mode vibration is originally produced by Coriolis force G when rotational movement is applied during fx mode vibration excited by driving electrodes 61, 62. This fy mode vibration is detected by detecting electrodes 71, 72, etc.

However, as shown with dotted lines in FIG. 12, there is a case that leak signals are transferred to detecting electrodes 71, 72, etc., even when tuning-fork type vibration body 51 is not rotating. More specifically, there exist four types of leakage in tuning-fork type vibration body 51: a leak Ay which produces fy mode vibration caused by area imbalance of driving electrodes 61, 62, etc.; a leak Ax produced during fx mode vibration caused by area imbalance of detecting electrodes 71, 72, etc.; an electric leak E produced between driving electrodes 61, 62, etc. and detecting electrodes 71, 72, etc.; and a leak kM produced by mechanical coupling resulting from an integral forming of driving electrodes 61, 62, etc. and detecting electrodes 71, 72, etc.

Leak Ay is a leak which produces unnecessary fy mode vibration even when tuning-fork type vibration body 51 is not rotating, being caused by area imbalance of driving electrodes 61, 62, etc. which are originally provided for exciting only fx mode vibration.

Leak kM caused by mechanical coupling of integrally formed arms 52, 53, is a leak which produces fy mode vibration directly originated by fx mode vibration even when tuning-fork type vibration body 51 is not rotating. In the embodiment, a sum of Ay (i.e. the leak producing fy mode vibration caused by area imbalance of driving electrodes 61, 62, etc.) and kM (i.e. the leak produced by mechanical coupling) accounts for approximately 10 percent of the total leakage.

Leak Ax is a leak which produces detecting voltage during fx mode vibration even when tuning-fork type vibration body 51 is not rotating, caused by area imbalance of detecting electrodes 71, 72, etc. Leak Ax reaches approximately 80 percent of the total leakage.

Further, electric leak E is caused by an electrostatic coupling produced between driving electrodes 61, 62, etc. and detecting electrodes 71, 72, etc. In the embodiment, electric leak E can be limited to approximately 10 percent of total leakage with the electrodes mutually disposed at sufficient spatial intervals.

As mentioned above, even when tuning-fork type vibration body 51 is not rotating, leak signals are transferred to tuning-fork type vibration body 51 through various routes. In order to detect angular rate of rotation with accuracy, each leak must be extracted separately and measures must be taken to reduce each leakage.

It must be noted that leak Ax, resulting from area imbalance of detecting electrodes 71, 72 etc. during fx mode vibration, occupies large weight in the tuning-fork type vibration gyro. Therefore the areas of detecting electrodes 71, 72, etc. must be trimmed accurately. For this purpose, it is required to extract only fx mode vibration, suppressing parasitically produced fy mode vibration.

Figure 13A:
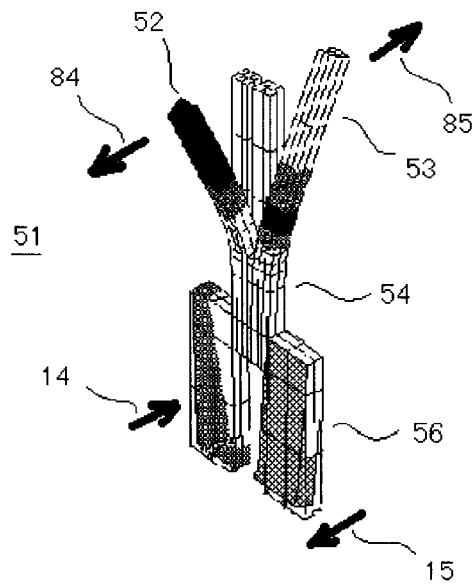
FIGS. 13A through 13C are explanatory diagrams of a trimming method for suppressing parasitic vibration.

In FIG. 13, there is shown an explanatory diagram of a method for trimming detecting electrodes in accordance with an embodiment of the present invention, to suppress parasitically produced fy mode vibration. In FIG. 13A, a state of parasitic fy mode vibration being produced in tuning-fork type vibration body 51 is illustrated. In tuning-fork type vibration body 51, parasitic fy mode vibration causes arms 52, 53 to vibrate, as shown with arrows 84, 85. At the same time support substrate 56 vibrates in a direction opposite to the ends of arms 52, 53, as shown with arrows 14, 15.

Figure 13B:
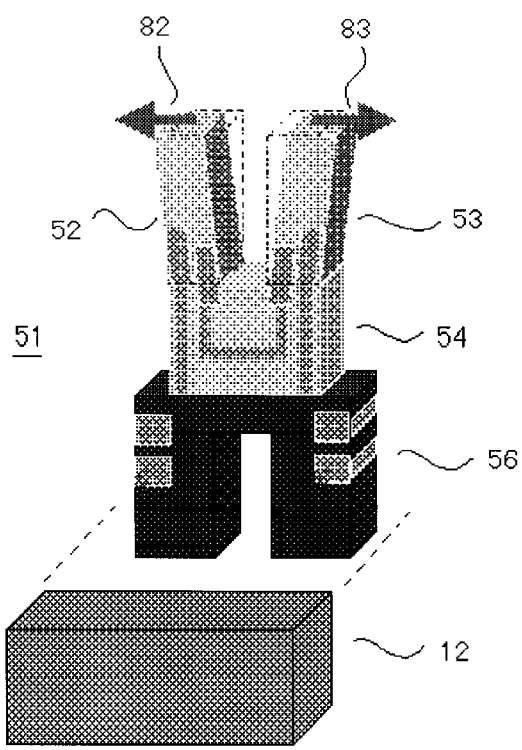

In such a case, in the electrode trimming method according to the embodiment, a pressing jig 12 formed of a rubbery elastic body or the like is provided for pressing support substrate 56 of tuning-fork type vibration body 51, as shown in FIG. 13B, so that parasitic fy mode vibration is suppressed for obtaining ideal fx mode vibration in arms 52, 53.

Figure 13C:
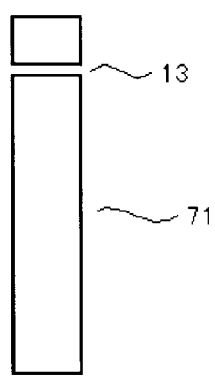

Trimming of detecting electrodes 71, 72, etc. is carried out so as to decrease sensor output obtained from detecting electrodes 71, 72, etc. in tuning-fork type vibration body 51, while the sensor output is being monitored. Here, as shown in FIG. 13C, the trimming of detecting electrodes 71, 72, etc. is performed by inserting a slit 13 into the ends of detecting electrodes 71 etc. to adjust areas of detecting electrodes 71 etc.

According to the embodiment, as described above, fy mode vibration is suppressed by pressing support substrate 56 of tuning-fork type vibration body 51 with pressing jig 12 formed of a rubbery elastic body, to suppress parasitic fy mode vibration so that only leak Ax caused by fx mode vibration can be extracted. Thus accurate trimming against area imbalance of detecting electrodes 71, 72, etc. is realized In FIG. 14, there is shown an explanatory diagram of electrode configuration of tuning-fork type vibration body 51, which is aimed to prevent misidentification of electrodes in a trimming process. According to the embodiment, in tuning-fork type vibration body 51 of the type shown in FIG. 2C having four-plane dummy electrodes integrally formed with detecting electrodes, relative positions between driving electrodes 62, 64, etc. and detecting electrodes 72, 75, etc. are disposed with deviation in the z-axis direction, as shown in FIG. 14.

According to the electrode configuration of the embodiment, because the relative positions of driving electrodes 62, 64, etc. and detecting electrodes 72, 75, etc. deviate in the z-axis direction, it is possible to prevent misidentification of electrodes to be trimmed in the trimming process of manufacturing a tuning-fork type vibration gyro.

Figure 14:
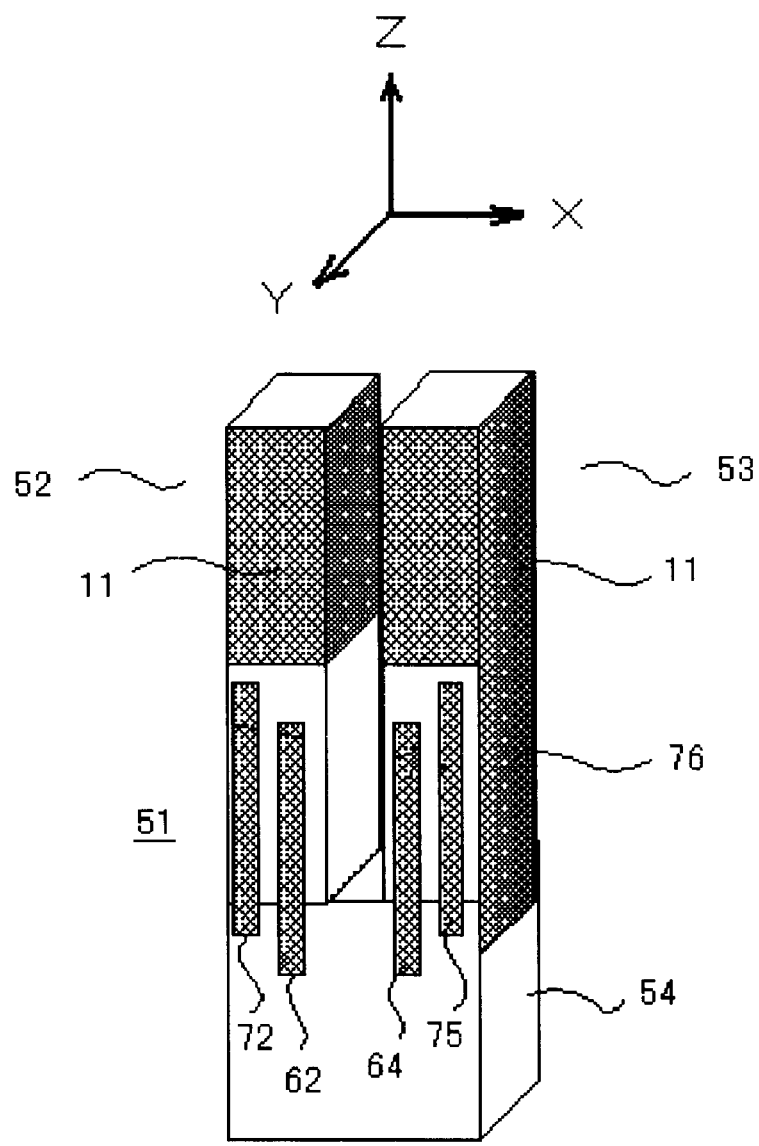
FIG. 14 is an explanatory diagram of the location relation between driving electrodes and detecting electrodes according to the invention.

In addition, the above embodiment in FIG. 14 illustrates tuning-fork type vibration body 51 of a type having four-plane dummy electrodes integrally formed with detecting electrodes. The method in the above embodiment is also applicable to different types of tuning-fork type vibration body 51 having either two-plane dummy electrodes shown in FIG. 2(1) or four-plane dummy electrodes shown in FIG. 2(2).

According to the embodiments of the present invention explained above, driving electrodes 61, 62, 63, 64 and detecting electrodes 71, 72, 74, 75 are disposed in relatively deviating positions in the z-axis direction. This contributes to prevent misidentification in the electrode trimming process, improving yield in manufacturing.

Effects of the present invention are summarized below:

According to the invention, dummy electrodes provided on the surface of arms may average surface potentials of a ferroelectric body, eliminating high potential portions. Even when charges on the surface of the ferroelectric body exceed in amount caused by temperature change, it is possible to prevent dielectric breakdown on the surface of the ferroelectric body. Thus pyroelectric noise generation is suppressed and a tuning-fork type vibration gyro having high SN ratio is obtained.

The driving electrodes and the detecting electrodes are disposed in relatively deviating positions in the z-axis direction, enabling to prevent misidentification of the driving electrodes and the detecting electrodes in a trimming process of manufacturing a tuning-fork type vibration gyro.

Further, a capacitor or voltage limiting element connected to input terminals of a differential amplifier can prevent pyroelectric noise from inputting to the differential amplifier, enabling to obtain a tuning-fork type vibration gyro having improved SN ratio.

Still further, a transistor of the differential amplifier in the first stage is separated from transistors thereof in the succeeding stages, to prevent pyroelectric noise from being transferred to the transistors in the succeeding stages. Thus a tuning-fork type vibration gyro having improved SN ratio may be obtained.

Still further, vibration of a support substrate is suppressed, resulting in suppressing parasitic vibration induced to arms, which enables to extract only a leak Ax caused by a vibration parallel to the x-axis (i.e. fx mode vibration). Accordingly, it is possible to trim area imbalance of detecting electrodes with accuracy.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A tuning-fork type vibration gyro comprising:
   a tuning-fork type vibration body having two arms mutually disposed in parallel and a base for commonly supporting one end of said each arm, wherein a longitudinal direction of said two arms is defined as a z-axis and a perpendicular direction thereto is defined as an x-axis;
   driving electrodes respectively formed on said two arms for generating vibration of said two arms in a direction parallel to said x-axis;
   detecting electrodes respectively formed on said two arms for detecting electromotive force generated when said tuning-fork type vibration body is rotated around said z-axis; and dummy electrodes formed on said two arms in respective areas different from said driving electrodes and said detecting electrodes.

2. A tuning-fork type vibration gyro comprising:

a tuning-fork type vibration body having three or more arms mutually disposed in parallel and a base for commonly supporting one end of said each arm, wherein a longitudinal direction of said three or more arms is defined as a z-axis and a perpendicular direction thereto is defined as an x-axis;

driving electrodes formed on at least two arms of said three or more arms for generating vibration of said two arms in a direction parallel to said x-axis;

detecting electrodes formed on at least one arm of said three or more arms for detecting electromotive force generated when said tuning-fork type vibration body is rotated around said z-axis; and dummy electrodes formed on said three or more arms in respective areas different from said driving electrodes and said detecting electrodes.

3. The tuning-fork type vibration gyro according to claim 1 or claim 2 wherein said tuning-fork type vibration body is formed of ferroelectric body.

4. The tuning-fork type vibration gyro according to claim 1, wherein said dummy electrodes are formed on four side faces of said each arm, being connected so that each dummy electrode has an identical potential.

5. The tuning-fork type vibration gyro according to claim 2, wherein said dummy electrodes are formed on four side faces of said each arm, being connected so that each dummy electrode has an identical potential.

6. The tuning-fork type vibration gyro according to claim 1, wherein said dummy electrodes are electrically connected to said detecting electrodes.

7. The tuning-fork type vibration gyro according to claim 2, wherein said dummy electrodes are electrically connected to said detecting electrodes.

8. The tuning-fork type vibration gyro according to claim 1, wherein said driving electrodes and detecting electrodes are disposed in deviating positions in said z-axis direction.

9. The tuning-fork type vibration gyro according to claim 2, wherein said driving electrodes and detecting electrodes are disposed in deviating positions in said z-axis direction.

* * * * *